United States Patent [19]
Gurgiolo

[11] 3,907,721
[45] Sept. 23, 1975

[54] HIGH RESILIENCY, FLEXIBLE POLYURETHANE FOAMS AND CROSSLINKERS FOR THE PREPARATION THEREOF

[75] Inventor: Arthur E. Gurgiolo, Lake Jackson, Tex.

[73] Assignee: The Dow Chemical Company, Midland, Mich.

[22] Filed: Mar. 4, 1974

[21] Appl. No.: 448,165

Related U.S. Application Data

[63] Continuation-in-part of Ser. No. 410,138, Oct. 26, 1973.

[52] U.S. Cl. .................. 260/2.5 AM; 260/2.5 AQ; 260/2.5 AW; 260/77.5 AQ; 260/77.5 NC
[51] Int. Cl.$^2$ .................. C08G 18/32; C08G 18/48; C08G 18/14
[58] Field of Search 260/2.5 AQ, 2.5 AM, 77.5 AQ, 260/2.5 AW, 77.5 NC

[56] References Cited
UNITED STATES PATENTS

| | | | |
|---|---|---|---|
| 3,088,948 | 5/1963 | Little | 260/307 C |
| 3,730,923 | 5/1973 | Formaini | 260/2.5 AQ |
| 3,738,953 | 6/1973 | Anorga | 260/2.5 AM |
| 3,756,970 | 9/1973 | Bauchwitz | 260/2.5 AC |
| 3,766,181 | 10/1973 | Pregler | 260/77.5 NC |
| 3,772,221 | 11/1973 | Hostettler | 260/2.5 AC |
| 3,775,350 | 11/1973 | Junas | 260/2.5 AM |
| 3,795,636 | 3/1974 | Huffman | 260/2.5 AC |
| 3,856,718 | 12/1974 | Taub | 260/2.5 AQ |

*Primary Examiner*—M. J. Welsh
*Assistant Examiner*—C. Warren Ivy
*Attorney, Agent, or Firm*—James G. Carter

[57] ABSTRACT

Reaction products of isocyanuric acid and derivatives thereof such as hydroxy-phenyl isocyanuric acid reacted with 1,2-epoxy-containing compounds such as a mixture of propylene oxide and phenyl glycidyl ether have been discovered to be effective substitutes for 4,4′-methylene-bis(2-chloroaniline) as a crosslinker in high resiliency, flexible, polyurethane foams. The crosslinkers of the present invention are not presently suspected of being carcinogenic.

10 Claims, No Drawings

HIGH RESILIENCY, FLEXIBLE POLYURETHANE FOAMS AND CROSSLINKERS FOR THE PREPARATION THEREOF

This application is a continuation-in-part of my previous application Ser. No. 410,138, filed Oct. 26, 1973.

This invention relates to high resiliency, flexible polyurethane foams and novel substances used as crosslinkers for the preparation thereof.

High resiliency, flexible polyurethane foams have heretofore been prepared from polyether triols and polyisocyanates but the use of a crosslinker such as 4,4'-methylene-bis(2-chloroaniline) has been required. This compound has been suspected of being carcinogenic; therefore the urethane industry has been searching for suitable substitutes for this compound.

It has now been unexpectedly discovered that certain crosslinkers described herein can suitably be substituted for the 4,4'-methylenebis(2-chloroaniline) in the preparation of flexible, high resiliency urethane foams and that these compounds are not at the present time suspected of being carcinogenic.

The present invention is therefore directed to flexible polyurethane foams having a resiliency of greater than about 50%, a modulus of at least about 2.3 resulting from subjecting to foaming conditions a composition which comprises A. a polyol composition consisting essentially of
1. from about 50 to 100 and preferably from about 75 to 100 parts by weight of a primary hydroxyl-containing polyether triol having an average hydroxyl equivalent weight of from about 900 to about 2500,
2. from 0 to about 50 and preferably from 0 to about 25 parts by weight of a diol, a triol, a polymer-containing diol, a polymer-containing triol or mixtures thereof wherein said polyols have an average hydroxyl equivalent weight of from about 900 to about 2500 and preferably from about 1000 to about 2000 and said polymer has an average molecular weight of at least about 5000 and preferably at least about 20,000,
B. an organic polyisocyanate consisting of
1. from about 50 to 100% and preferably from about 75 to 100% by weight of 2,4-toluene diisocyanate, 2,6-toluene diisocyanate, NCO-containing prepolymers thereof, or mixtures thereof, and
2. from 0 to about 50% and preferably from about 0 to 25% by weight of an organic polyisocyanate having an average functionality of at least 2,
C. from about 1.0 to about 5 and preferably from about 2.0 to about 3.0 parts by weight of water per 100 parts by weight of component (A),
D. from 0 to about 20 and preferably from about 5 to about 10 parts of a low boiling auxiliary blowing agent per 100 parts by weight of component (A),
E. from about 1 to about 10 and preferably from about 3 to about 5 parts per 100 parts by weight of component (A) of a crosslinker composition consisting essentially of
1. from 30 to 100 and preferably from 50 to 100 percent by weight of a primary crosslinker component consisting of an oxyhydrocarbon or oxyhydrocarboxy derivative of isocyanuric acid or aryl substituted isocyanuric acid or mixture thereof, and
2. from 0 to about 70 and preferably from 0 to about 50 percent by weight of an auxiliary crosslinker component.
F. from about 0.5 to about 4 and preferably from about 0.7 to about 1.5 parts by weight per 100 parts by weight of Compound (A) of a catalyst for urethane formation;
G. from about 0.005 to about 1.5 and preferably from about 0.03 to about 0.05 parts by weight per 100 parts by weight of Component (A) of a silicone oil cell control agent; and wherein Components (A), (B), (C) and (E) are present in quantities so as to provide an NCO:active hydrogen equivalent ratio of from about 0.8:1.0 to about 1.3:1.0 and preferably from about 0.9:1.0 to about 1.1:1.0.

Suitable primary-hydroxyl containing triols which may be suitably employed as component (A1) include the reaction products of glycerine, trimethylolpropane, hexane triol, mixtures thereof or the like, with a 1,2-alkylene oxide having from 2 to about 4 carbon atoms or a mixture of such alkylene oxides and subsequently endcapping the resultant polyol with at least 1 mole of ethylene oxide per hydroxyl group and wherein the resultant end-capped triol has an average hydroxyl equivalent weight of from about 900 to about 2500 and preferably from about 1200 to about 2000. The primary-hydroxyl containing polyether polyol usually contains from about 4 to about 20% by weight of ethylene oxide on the end of the molecule.

The term polymer-containing diols and triols which may be employed as component (A-2) include those diols and triols having an average hydroxyl equivalent weight in the range of from about 900 to about 2500 and preferably from about 1000 to about 2000 and which contain from about 2 to about 50 and preferably from about 5 to about 20 parts by weight polymer having an average molecular weight of at least about 5000, and preferably at least about 20,000.

Such polymers may be physically blended with the diol or triol or they may be prepared in situ in the diol or triol wherein the diol or triol, or mixture thereof, are employed as the solvent or reaction medium for the polymerization and in some instances, the polymers are grafted onto the diol or triol.

Suitable such polymers and methods for their preparation are taught in U.S. Pat. Nos. 3,405,162; 3,652,639; 3,304,273; 3,383,351; and 3,523,093. So much of those applications as pertains to polymers and methods for their preparation are incorporated herein by reference.

The polymers may also be prepared by the aqueous emulsion techniques common to the "latex" art or as a dispersion in a non-isocyanate reactive medium. The polymers may be employed in the dry form, i.e. added to the triol or diol after removal of the water or non-isocyanate reactive medium therefrom or preferably the "latex" or dispersion itself may be added to the diol or triol and the water or non-isocyanate reactive medium subsequently removed therefrom by known procedures for removing water or other components from polyols such as evaporation under vacuum and the like.

The polymers employed herein may contain groups which are reactive with the NCO groups contained in the polyisocyanate, but it is not a requirement herein that said polymers contain such groups.

Particularly suitable polymers are those prepared by polymerizing one or more monomers containing ethylenic unsaturation such as, for example, styrene, acrylic acid, methacrylic acid, acrylonitrile, butadiene, crotonic acid, itaconic acid, dimethylaminomethymethacrylate, acrylamide, maleic acid, ethylacrylate, methylacrylate, butylacrylate, methylmethacrylate, ethylmethacrylate, butylmethacrylate, 2-ethylhexylacrylate, 2-ethylhexylmethacrylate, vinyl chloride, and monomethymaleate.

Suitable diols and triols which may be employed as component (A-2) include those prepared by the reaction of a compound containing 2 or 3 active hydrogen groups such as, for example, water, ethylene glycol, propylene glycol, 1,4-butane diol, 1,6-hexane diol, glycerine, trimethylol propane, mixtures thereof and the like with a 1,2-epoxy compound such as ethylene oxide, 1,2-propylene oxide, 1,2-butylene oxide, 2,3-butylene oxide, styrene oxide, mixtures thereof and the like and which have an average hydroxyl equivalent weight of from about 900 to about 2500 and preferably from about 1000 to about 2000. Also suitable are the polyester diols having an average hydroxyl equivalent weight of from about 900 to about 2500 and preferably from about 1000 to about 2000.

Suitable organic polyisocyanates which may be employed in admixture with the toluene diisocyanate or prepolymers thereof include any such isocyanate which does not contain a substituent group which is capable of reacting with the polyether triol. Suitable such isocyanates include
  polymethylene polyphenylisocyanate,
  1,5-naphthalenediisocyanate,
  cumene-2,4-diisocyanate,
  4-methoxy-1,3-phenylenediisocyanate,
  4-chloro-1,3-phenylenediisocyanate,
  4-bromo-1,3-phenylenediisocyanate,
  4-ethoxy-1,3-phenylenediisocyanate,
  isophoronediisocyanate,
  2,4'-diisocyanatodiphenylether,
  5,6-dimethyl-1,3-phenylenediisocyanate,
  2,4-dimethyl-1,3-phenylenediisocyanate,
  4,4'-diisocyanatodiphenylether,
  benzidinediisocyanate,
  4,6-dimethyl-1,3-phenylenediisocyanate,
  4,4'-diisocyanatodibenzyl,
  9,10-anthracenediisocyanate,
  3,3'-dimethyl-4,4'-diisocyanatodiphenylmethane,
  2,6'-dimethyl-4,4'-diisocyanatodiphenyl,
  2,4-diisocyanatostilbene,
  3,3'-dimethyl-4,4'-diisocyanatodiphenyl,
  3,3'-dimethoxy-4,4'-diisocyanatodiphenyl,
  1,4-anthracenediisocyanate,
  2,5-fluorenediisocyanate,
  1,8-naphthalenediisocyanate,
  2,6-diisocyanatobenzfuran,
  2,4,6-toluenetriisocyanate, and
  2,4,4'-triisocyanatodiphenylether,
  crude or undistilled isocyanates,
  dimers or trimers of toluene diisocyanates.

Other organic polyisocyanates that can be used are the polyisocyanates described in Canadian Pat. No. 700,026 and in U.S. Pat. No. 2,683,730; the phenyl indane diisocyanates which are described in U.S. Pat. No. 2,855,385, the organic diisocyanates and the organic triisocyanates which are described in U.S. Pat. No. 2,292,443; and the organic triisocyanates which are described in U.S. Pat. No. 2,929,794.

Suitable NCO-containing prepolymers of 2,4- and 2,6-toluenediisocyanate which can be employed as the polyisocyanate component (B1) includes those prepared by reacting an excess of the toluenediisocyanate with a substance having from 2 to about 4 active hydrogen atoms and an active hydrogen equivalent weight of from about 30 to about 2500, preferably from about 30 to about 300.

Suitable such active hydrogen-containing substances include for example, ethylene diamine, ammonia, methyl amine, aminoethylethanol amine, propylene diamine, ethylene glycol, propylene glycol, butylene glycol, hexane diol, pentanediol, bisphenols, halogen substituted bisphenols, neopentyl glycol, halogenated neopentyl glycol, adducts of such active hydrogen-containing substances with vic-epoxy-containing compounds such as for example, ethylene oxide, propylene oxide, 1,2-butylene oxide, 2,3-butylene oxide, styrene oxide, epichlorohydrin, epibromohydrin, phenyl glycidyl ether, butyl glycidyl ether, dibromophenyl glycidyl ether, mixtures thereof and the like.

It is preferred that the NCO-containing prepolymer contain from about 10 to about 45% free NCO groups by weight.

It should be understood that in the preparation of prepolymers from an excess of the toluene diisocyanate, that the resultant product will usually contain some unreacted toluene diisocyanate.

Suitable oxyhydrocarbon or oxyhydrocarboxy derivatives of isocyanuric acid or aryl substituted isocyanuric acid which may be employed herein are those represented by the general formula

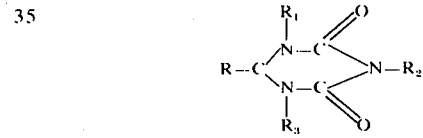

wherein R is =O or a member of the group represented by the formula

wherein each R' and R" are independently hydrogen, Cl, Br, OH or an alkyl group having from 1 to about 6 carbon atoms, each $R_1$, $R_2$ and $R_3$ is independently selected from the formulas

wherein each $R_4$ is independently hydrogen, phenyl, methyl, ethyl or halomethyl, each $R_5$ and $R_6$ are independently hydrogen or methyl with the proviso that only one of such groups can be a methyl group, each $n$ is independently 0, 1, 2 or 3; and

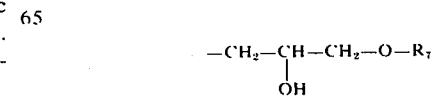

wherein $R_7$ is selected from the group consisting of allyl, methallyl, an aryl group, a haloaryl group, a dihaloaryl group or an alkaryl group said aryl, haloaryl, dihaloaryl and alkaryl groups being represented by the formula

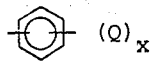

wherein Q is a halogen or an alkyl group and $x$ has a value of 1 when Q is an alkyl group and a value of 1 or 2 when Q is a halogen or $x$ has a value of zero; with the proviso that no more than 2 of the $R_1$, $R_2$ and $R_3$ groups can be represented by the formula

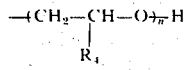

when $R_4$ is hydrogen, methyl or halomethyl.

Organotin catalysts such as stannous octoate, dibutyltindilaurate and the like may also be employed together with the tertiary amine catalyst if desired.

The above crosslinker compounds may be prepared by reacting the isocyanuric acid or an isocyanuric acid derivative with a 1,2-epoxide-containing compound in a molar ratio of cyanuric acid to epoxide-containing compound of from about 1:2.5 to about 1:3.5 and preferably from about 1:2.9 to about 1:3.1 in the presence of a suitable basic catalyst and a low polar or non-polar solvent or reaction medium at temperatures of from about 80° to about 120° and preferably from about 100° to about 120°C until the reaction is essentially complete and subsequent removal of the solvent by conventional means.

In addition to isocyanuric acid, suitable isocyanuric acid derivatives which may be employed include, for example, 2-hydroxyphenyl isocyanuric acid, phenyl isocyanuric acid, methyl isocyanuric acid, ethyl isocyanuric acid, butyl isocyanuric acid, propyl isocyanuric acid, mixtures thereof and the like.

Suitable 1,2-epoxy-containing compounds which may be employed include, for example, ethylene oxide, 1,2-propylene oxide, 1,2-butylene oxide, 2,3-butylene oxide, 1,2-isobutylene oxide, epichlorohydrin, phenyl glycidyl ether, butyl glycidyl ether, styrene oxide, mixtures thereof and the like.

Suitable basic catalysts which may be employed include sodium hydroxide, potassium hydroxide, benzyl trimethyl ammonium chloride, tetramethyl ammonium chloride, tetramethyl ammonium bromide, dodecyl dimethyl (2-phenoxyethyl) ammonium bromide and the like.

Suitable solvents or reaction mediums which may be employed include, for example, carbon tetrachloride, trichloromethane, dichloromethane, 1,2-dichloroethane, 1,1,2,2-tetrachloroethene, 1,1,2,2-tetrachloroethane, 1,1,1-trichloroethane, mixtures thereof and the like.

The isocyanuric acid from which many of the crosslinkers employed herein are prepared is a well known article of commerce.

The aromatic and substituted aromatic isocyanuric acid derivatives from which many of the crosslinkers are prepared may be prepared by the reaction of urea or biuret with benzeldehyde, substituted benzaldehyde, benzal chloride or substituted benzal chloride as taught in *s-TRIAZINES AND DERIVATIVES*, Interscience Publishers, Inc., 1959, pages 211–212.

Suitable such compounds represented by the above formula which may be employed as a crosslinker herein include, for example, N-3-phenoxy-2-hydroxypropyl-N'-N'' bis(2-hydroxypropyl)isocyanurate, N-2-hydroxypropyl-N'-N'' bis(3-phenoxy-2-hydroxypropyl)isocyanurate, N-3-phenoxy-2-hydroxypropyl-N'-N''-bis(2-hydroxybutyl)isocyanurate, N-3-p-methylphenoxy-2-hydroxypropyl-N',N'' bis(2-hydroxypropyl)isocyanurate, N-2-phenyl-2-hydroxyethyl-N'-N''-bis(2-hydroxypropyl)isocyanurate, N,N',N''-tris(2-hydroxypropyl)-p-hydroxyphenylisocyanurate, N,N',N''-tris(2-hydroxypropyl)-phenylisocyanurate, mixtures thereof and the like.

Suitable auxiliary crosslinker compounds include, for example, tris(polyoxyalkylene alkanol) amines; mono-, di- and tri-isopropanol amines; oxydianiline; vicinal hydroxyl amines containing at least 4 carbon atoms; mono-, di-, and triethanol amines; an aliphatic diol or a polyether diol, said diols having an OH equivalent weight of less than about 300 and preferably less than about 200;

Suitable tris(polyoxyalkylene alkanol) amines which may be employed herein include those represented by the formula

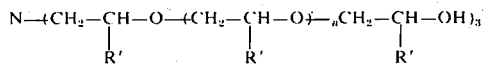

wherein each R' is independently hydrogen, methyl or ethyl, and each $n$ has an average value of from zero to about 5. The substances represented by the above formula are readily prepared by the condensation of ammonia with an alkylene oxide such as ethylene oxide, 1,2-propylene oxide, 1,2-butylene oxide, 1,2-isobutylene oxide, or mixtures thereof. The products of the condensation reaction are most generally a mixture of products, wherein the components of the mixture can be, if desired, separated by distillation or other suitable means or the mixture itself can be employed as an auxiliary crosslinker.

Suitable vicinal hydroxyl amine compounds containing at least 4 carbon atoms which can be employed herein include, for example, those represented by the general formulas:

I. 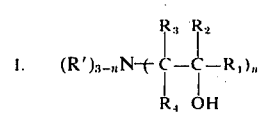

wherein $R_1$, $R_2$, $R_3$ and $R_4$ are independently hydrogen, an alkyl group having from 1 to about 10 carbon atoms, or a —C—O—$R_5$ group wherein $R_5$ is an aliphatic hydrocarbon group having from 1 to about 10 carbon atoms, a phenyl group, a one to four carbon alkyl substituted phenyl group, or a mono or dihalo substituted phenyl group, R' is hydrogen, an aliphatic hydrocarbon group having from 1 to about 10 carbon atoms, a hydroxy alkyl group having from 1 to about 10 carbon atoms or a phenyl group and wherein $n$ has a value of 1 to 3 inclusive, with the proviso that the sum of the carbon atoms contained in the $R_1$, $R_2$, $R_3$ and $R_4$ groups is at least 2.

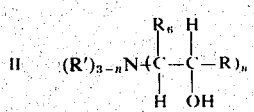

II  $(R')_{3-n}N\{C-C-R)_n$
         H OH wherein R and $R_6$ collectively represent a divalent 3 to 6 carbon atom saturated or unsaturated hydrocarbon group thereby forming a 5 to 8 membered ring and wherein R' and $n$ are as defined in formula I above.

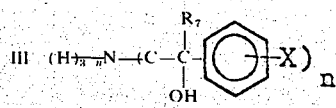

III  $(H)_{3-n}N-C-\bigcirc-X)_n$
              OH or

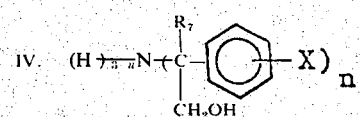

IV  $(H)_{3-n}N-C-\bigcirc-X)_n$
              $CH_2OH$ wherein each $R_7$ is independently hydrogen or an alkyl group having from 1–4 carbon atoms, each X is independently hydrogen, chlorine, bromine or an alkyl group having from 1–4 carbon atoms and $n$ has a value of from 1 to 3 inclusive.

Suitable vicinal hydroxyl amine compounds include, for example, 1-amino-2-hydroxybutane, bis(2-hydroxybutyl) amine, tris(2-hydroxybutyl)amine, 3-phenoxy-2-hydroxypropylamine, 2-phenyl-2-hydroxyethylamine, 1-amino-2-hydroxycyclopentane, 2-hydroxypropyl-N-phenylamine, 2-hydroxyethyl-N-phenylamine, 3-phenoxy-2-hydroxypropyl-N-phenylamine, 2-hydroxybutyl-N-phenylamine, bis(3-phenoxy-2-hydroxypropyl) amine, 2-hydroxyethyl-N-(3-phenoxy-2-hydroxypropyl)amine, 1-amino-2-hydroxy-cyclohexane, 1-amino-2-hydroxycyclooctane, 2-hydroxyethyl-N-(2-hydroxybutyl)amine.

The vicinal hydroxyl amine compounds are readily prepared by reacting ammonia, a primary or secondary amine or a primary or secondary hydroxyl amine with a vicinal epoxy-containing compound employing known procedures.

Suitable aliphatic diols which may be employed as a crosslinker herein include, for example, ethylene glycol, diethylene glycol, propylene glycol, dipropylene glycol, 1,2-butane diol, 1,3-butane diol, 1,4-butane diol, mixtures thereof and the like.

Suitable polyether diols which may be employed as a crosslinker herein include, for example, polyoxyethylene glycols, polyoxypropylene glycols, polyoxybutylene glycols, mixtures thereof and the like.

Suitable silicone oils include polymers of dimethyl siloxane having a viscosity at 77°C. of 5 centistokes or other silicone oils which are commercially available.

Suitable auxiliary blowing agents include aliphatic hydrocarbons boiling below 110°C. or halogenated aliphatic hydrocarbons boiling below 110°C. such as dichlorodifluoromethane, trichlorofluoromethane, hexane, hexene, or pentane as the blowing or foaming agent. Suitable foaming agents are disclosed in U.S. Pat. No. 3,072,582.

Suitable tertiary amine catalysts include, for example, triethylenediamine, N-ethylmorpholine, N(dimethylaminoethyl)piperazine, N,N'-bis(dimethylaminoethyl)piperazine, tetramethyl butanediamine, dimethylethanolamine, bis(2-dimethylaminomethyl)ether, mixtures thereof and the like.

Organometal catalysts such as stannous octoate, dibutyltindilaurate and the like may also be employed either alone or together with the tertiary amine catalyst if desired.

Inorganic and organic fillers such as, for example, calcium carbonate, barytes, sand, expandable polystyrene beads, and the like may be included in the foams of the present invention.

Fire retardant agents such as, for example, tris(2,3-dibromopropyl)phosphate; tris(2-chloroethyl)phosphate; tris(dichloropropyl)phosphate; triethylphosphate; mixtures thereof, and the like may also be employed in the foams of the present invention.

The crosslinker materials which are believed to be new compositions of matter may be represented by the general formulas:

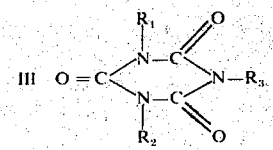

wherein $R_1$, $R_2$, and $R_3$ are independently selected from the group represented by the formulas

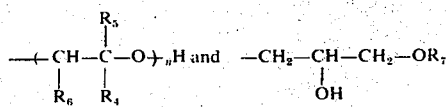

wherein $R_4$ is hydrogen, an alkyl group having 1 to 2 carbon atoms, aryl, alkaryl, haloaryl, haloalkyl, $n$ has a value of 1 to about 4 and preferably from about 1 to about 2; $R_5$ and $R_6$ are independently hydrogen or methyl with the proviso that only one of such group can be a methyl group; $R_7$ is selected from the group consisting of allyl, methallyl, an aryl group, a haloaryl group, a dihaloaryl group and an alkaryl group with the proviso that no more than 2 of the $R_1$, $R_2$ and $R_3$ groups can be represented by the formula

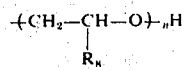

wherein $R_8$ is hydrogen or an alkyl group having from 1 to about 3 carbon atoms; and

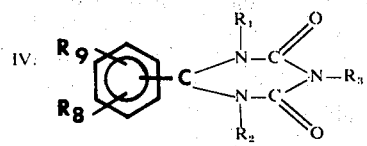

wherein $R_1$, $R_2$ and $R_3$ are independently selected from the group represented by the general formulas

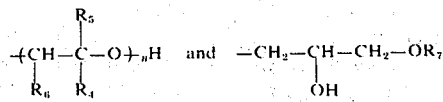

wherein $R_4$ is hydrogen, an alkyl group having 1 to 2 carbon atoms, aryl, alkaryl, haloaryl or haloalkyl, $n$ has a value of 1 to about 4, $R_5$ and $R_6$ are independently hydrogen or a methyl group with the proviso that only one of such groups can be a methyl group, and $R_7$ is selected from the group consisting of allyl, methallyl, an aryl group, a haloaryl group, a dihaloaryl group, and an alkaryl group and wherein each $R_8$ and $R_9$ are independently hydrogen, —OH, or an alkyl group having from 1 to about 4 carbon atoms.

It should be readily apparent from the description of the preparation of the crosslinkers employed herein that they are mixtures of products which are represented by the general formulas shown previously and that no particular emphasis should be placed on the ring position of any particular substituent group in that such positions are not believed to have any particular bearing on the product or product mixture so as to perform as a crosslinker in the preparation of high resiliency, flexible polyurethane foams.

The following examples are illustrative of the present invention, but are not to be construed as to limiting the scope thereof in any manner.

PREPARATION OF CROSSLINKER COMPOUNDS — COMPONENT (E)

A series of crosslinker compounds were prepared by charging a pressure container, either a glass citrate bottle or stainless steel bomb, with the reactants, catalyst and solvent or reaction medium. The pressure container was sealed and placed in an autoclave. After removal from the autoclave, the solvent or reaction medium and volatiles were removed by heating at reduced pressure. The reactants, solvent medium, catalyst reaction conditions, and resultant products are given in the following Table I.

TABLE I

|  | Crosslinker A | Crosslinker B | Crosslinker C | Crosslinker D | Crosslinker E | Crosslinker F |
|---|---|---|---|---|---|---|
| Isocyanuric acid, grams/moles | 97/0.75 | — | — | 65/0.5 | 64.5/0.5 | 64.5/0.5 |
| p-Hydroxyphenylisocyanuric acid, grams/moles | — | 82/0.4 | — | — | — | — |
| Phenylisocyanuric acid, g/moles | — | — | 90.6/0.474 | — | — | — |
| 1,2-Propylene oxide, grams/moles | 122/2.1 | 100/1.72 | 100/1.72 | — | 60/1 | 60/1 |
| Ethylene oxide, grams/moles | — | — | — | — | — | — |
| Styrene oxide | — | — | — | — | — | — |
| Phenyl glycidyl ether, grams/moles | 112/.75 | — | — | — | — | — |
| 1,2-Butylene oxide, grams/moles | — | — | — | 120.8/1.67 | — | — |
| Cresyl glycidyl ether, g/moles | — | — | — | — | 82/0.5 | — |
| Dibromophenyl glycidyl ether | — | — | — | — | — | 154/0.5 |
| Benzyl trimethyl ammonium chloride, 60% aq. sol., grams | 3 | 5 | 4 | 2 | 2 | 2 |
| $CH_2Cl_2$, grams | 40 | 150 | 70 | 70 | 100 | 100 |
| Reaction Temperature, °C | 100 | 115 | 100 | 100 | 110 | 110 |
| Reaction Time, hours | 23 | 24 | 138* | 18 | 18 | 18 |
| Product recovered, grams/% yield | 293/99 | 138.6/79 | 120/70 | 168/97 | 195/95.5 | 249/90 |
| % OH, by analysis/theoretical | 10.7/12.9 | 11.09/13.4 | 11.6/14.0 | 14/14.8 | 11.5/12.48 | 8.93/9.24 |
| % N, by analysis/theoretical | 10.4/10.62 | 11.34/11.02 | 9.7/11.5 | 11.4/12.15 | 11.8/10.27 | 7.43/7.60 |
| Visual description of product | milky, translucent syrup when hot which solidified to a glass when cooled | reddish brown tar | tan viscous viscous syrup | translucent colorless, syrup | milky viscous tar | tan viscous |

|  | Comparative Crosslinker G | Crosslinker H | Comparative Crosslinker I |
|---|---|---|---|
| Isocyanuric acid, grams/moles | 20 lbs/0.155 | 64.5/0.5 | 64.5/0.5 |
| p-Hydroxyphenylisocyanuric acid, grams/moles | — | — | — |
| Phenylisocyanuric acid, g/moles | — | — | — |
| 1,2-Propylene oxide, grams/moles | 28.75 lbs/0.495 | 58/1 | — |
| Ethylene oxide, grams/moles | — | — | 70.5/1.6 |
| Styrene oxide | — | 60/0.5 | — |
| Phenyl glycidyl ether, gms/moles | — | — | — |
| 1,2-Butylene oxide, grams/moles | — | — | — |
| Cresyl glycidyl ether, g/moles | — | — | — |
| Dibromophenyl glycidyl ether | — | — | — |
| Benzyl trimethyl ammonium chloride, 60% aq. sol., grams | 44 | 2 | 5 |
| $CH_2Cl_2$, grams | 31 lbs. | 100*** | 60 |
| Reaction Temperature, °C | ** | 110 | 110 |
| Reaction Time, hours | ** | 43 | 15 |
| Product recovered, grams/% yield | — | 180/98 | 135 |
| % OH, by analysis/theoretical | 13.4/16.83 | 8.5/14.0 | 18.14/19.5 |
| % N, by analysis/theoretical | — | 10.5/11.5 | 15.4/16.1 |
| Visual description of product | — | Viscous tan tar | White Powder |

*After 42 hours, some solid was still present and 1 gram of triethylamine was added and the reaction was continued for an additional 96 hours.
**The propylene oxide was added at 120°C to a 10 gallon pressure reactor containing the other components over a period of 24 hours after which the reaction mixture was digested for 24 hours at 120°C. The product was recovered by filtering and flashing at 80°C under vacuum.
***$CH_3CCl_3$ was employed instead of $CH_2Cl_2$.

PREPARATION OF HIGH RESILIENCY FOAMS

In each of the following examples, all of the components except the isocyanate were blended together until the components were equally dispersed. Then the isocyanate was quickly added and after stirring for several seconds the mixture was poured into a vented closed mold and the mixture allowed to foam.

The compositions and the physical properties of the foams are given in the following Table II.

TABLE II

|  | FOAM No. A | FOAM No. B | FOAM No. C | FOAM No. D | FOAM No. E | FOAM No. F | Comparative FOAM No. G | FOAM No. H | Comparative FOAM No. I |
|---|---|---|---|---|---|---|---|---|---|
| Polyol, Type/grams | A/100 | A/100 | A/100 | A/100 | A/100 | A/100 | A/100 | A/100 | A/100 |
| Polyisocyanate, Type/grams | A/34.4 | A/36.4 | A/34.6 | A/35 | A/33.1 | A/33.5 | A/34 | A/34.8 | A/36.3 |
| Water, grams | 2.5 | 2.5 | 2.5 | 2.5 | 2.5 | 2.5 | 2.5 | 2.5 | 2.5 |
| Silicone oil, grams | .03 | .03 | .03 | .03 | 0.03 | 0.03 | 0.03 | 0.03 | 0.03 |
| Catalyst, Type/grams | A/0.8 B/0.1 | A/0.6 B/0.1 | A/0.6 B/0.1 | A/0.6 B/0.1 | A/0.8 B/0.1 | A/0.8 B/0.1 | A/0.8 B/0.1 | A/0.8 B/0.1 | A/0.8 B/0.1 |
| Crosslinker, Type/grams | A/5 | B/5 | C/5 | D/5 | E/3 | F/5 | G/5 | H/5 | I/5 |
| Density, lbs/ft$^3$ | 2.88 | 3.09 | 2.95 | 2.79 | 2.95 | 2.87 | Foam Collapsed, Properties could not be determined | 2.93 | Foam Collapsed, Properties could not be determined |
| Resiliency, %[1] | 53 | 57 | 51 | 49 | 58 | 60 |  | 54 |  |
| 25% ILD[3] | 37.7 | 45 | 38.6 | 33.5 | 37 |  |  | 38 |  |
| 65% ILD[3] | 100 | 118 | 106 | 94 | 91.5 | 98.5 |  | 100 |  |
| Modulus[2] | 2.65 | 2.6 | 2.75 | 2.55 | 2.61 | 2.66 |  | 2.63 |  |

[1] Resiliency was determined by ASTM-D-1564-71.
[2] Modulus is the 65% ILD:25% ILD.
[3] ILD is Indentation Load Deflection at 25% and 65% by ASTM D-1564-71.

POLYOL A was the reaction product of glycerine with propylene oxide, end capped with about 13–15% by weight of ethylene oxide and the resultant polyol had an OH equivalent weight of about 1650.

POLYISOCYANATE A was a crude toluene diisocyanate containing 92.6% by weight of a 66.6/26 mixture of 2,4-/2,6-toluene diisocyanate and 7.4% by weight of higher homologs of toluene diisocyanate, the crude product had an NCO equivalent weight of about 91.2.

CATALYST A was a 33% solution of triethylene diamine in dipropylene glycol.

CATALYST B was bis(2-dimethylaminoethyl)ether.

I claim:

1. A flexible polyurethane foam having a resiliency greater than about 50%, a modulus of at least about 2.3 and a density of less than about 5 lbs/ft$^3$ resulting from subjecting to foaming conditions, a composition which comprises
   A.
      1. from about 50 to 100 parts by weight of a primary hydroxyl-containing polyether triol containing an end-cap of at least 1 mole of ethylene oxide per hydroxyl group and having an average hydroxyl equivalent weight of from about 900 to about 2500;
      2. from 0 to about 50 parts by weight of a polyol selected from a diol, a triol, or mixtures thereof wherein said diols and triols have an average hydroxyl equivalent weight of from about 900 to about 2500;
   B. an organic polyisocyanate consisting of
      1. from about 50 to 100% by weight of 2,4-toluene diisocyanate; 2,6-toluene diisocyanate; NCO-containing prepolymers thereof or mixtures thereof and
      2. from 0 to about 50% by weight of an organic polyisocyanate having an average NCO functionality of at least 2;
   C. from about 1.0 to about 5 parts by weight of water per 100 parts by weight of Component (A);
   D. from about 0 to about 20 parts of a low boiling auxiliary blowing agent per 100 parts by weight of Component (A);
   E. from about 1 to about 10 parts per 100 parts by weight of Component (A) of a crosslinker composition consisting essentially of
      1. from 30 to 100 percent by weight of a primary crosslinker component represented by the general formula

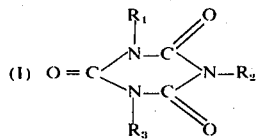

(I)

wherein each $R_1$, $R_2$ and $R_3$ is independently selected from the formulas

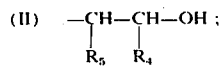

(II)

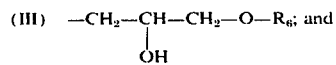

(III)

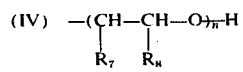

(IV)

wherein $R_4$ and $R_5$ are selected from the group consisting of hydrogen, methyl, ethyl, halomethyl, and phenyl with the proviso that when one of $R_4$ and $R_5$ is ethyl, halomethyl, or phenyl the other is hydrogen; $R_6$ is selected from the group consisting of allyl, methallyl or a group represented by the formula

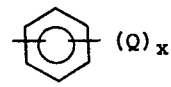

wherein Q is a halogen or an alkyl group and $x$ has a value of 1 when Q is an alkyl group and a value of 1 or 2 when Q is a halogen or x has a value of zero; wherein $R_7$ and $R_8$ are selected from the group consisting of hydrogen, methyl, $-CH_2-O-R_6$, and phenyl with the proviso that only one of $R_7$ or $R_8$ can be hydrogen and with the further proviso that when one of $R_7$ or $R_8$ is $-CH_2-O-R_6$ or phenyl the other is hydrogen; and $n$ has a value of 1, 2 or 3; with the proviso that no more than 2 of the $R_1$, $R_2$ and $R_3$ groups can be represented by the formula II when $R_4$ or $R_6$ is hydrogen, methyl, or halomethyl when the other is hydrogen;

2. from 0 to about 70 percent by weight of an auxiliary crosslinker component;

F. from about 0.5 to about 4 parts by weight per 100 parts by weight of Component (A) of a catalyst for urethane formation;

G. from about 0.005 to about 1.5 parts by weight per 100 parts by weight of Component (A) of a silicone oil cell control agent;

and wherein Components (A), (B), (C) and (E) are present in quantities so as to provide an NCO:active hydrogen equivalent ratio of from about 0.8:1.0 to about 1.3:1.0.

2. The flexible polyurethane foam of claim 1 wherein Components (A), (B), (C) and (E) are employed in quantities so as to provide an NCO:active hydrogen ratio of from about 0.9:1 to about 1.1:1, and Component (E) is present in quantities of from about 2 to about 5 parts by weight per 100 parts by weight of Component (A) and wherein Component (A) comprises from 75-100 parts of (1) and 0-25 parts by weight of (2).

3. The flexible polyurethane foam of claim 2 wherein Component (E1) is present in quantities of from about 50 to about 100 percent and Component (E2) is present in from about 0 to about 50 percent.

4. The flexible polyurethane foam of claim 3 wherein Component E consists of 100 percent of Component (E1).

5. The flexible polyurethane foam of claim 4 wherein Component (A-1) is a glycerine initiated polyether polyol.

6. The flexible polyurethane foam of claim 5 wherein Component (A2) is absent from the composition.

7. The foam of claim 1 wherein Component (A-1) contains a polymer having a molecular weight of at least about 5000.

8. The foam of claim 1 wherein in Component (E-1) at least one of the $R_1$, $R_2$, $R_3$ groups is the group

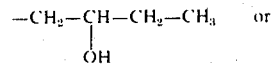

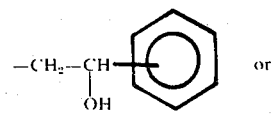

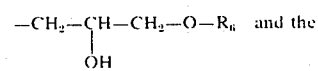

other $R_1$, $R_2$ and $R_3$ groups are 2-hydroxylpropyl groups.

9. The foam of claim 8 wherein $R_6$ is the group

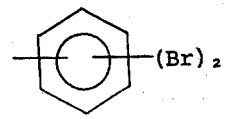

10. The foam of claim 8 wherein each of the $R_1$, $R_2$ and $R_3$ groups are the group $—CH_2—CH—CH_2—CH_3$.

* * * * *